Jan. 15, 1952     L. J. FAITH-ELL     2,582,244
GRATER HAVING ROTATABLE FEED MEANS
Filed Oct. 17, 1947     2 SHEETS—SHEET 1
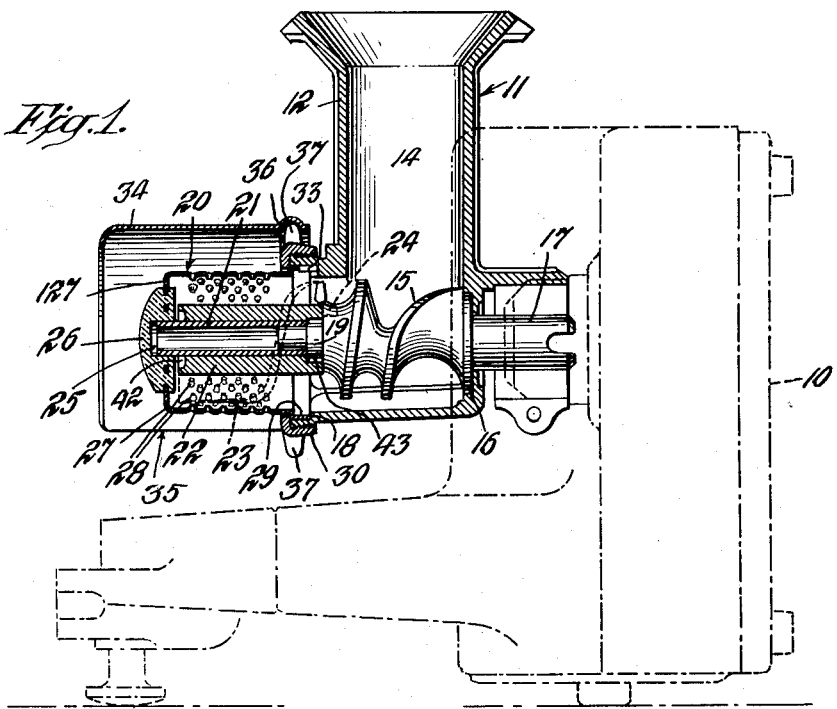
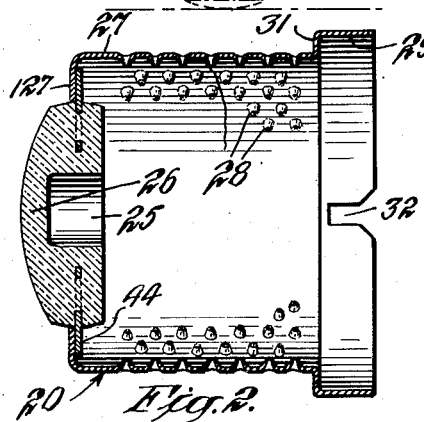
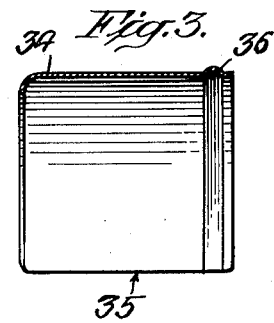
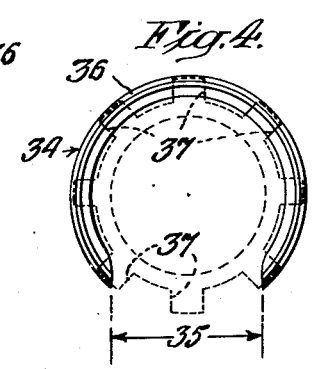
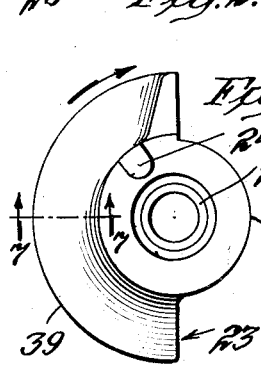
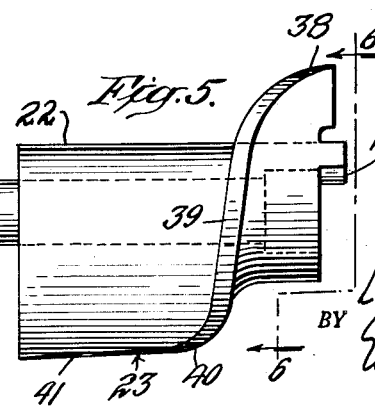
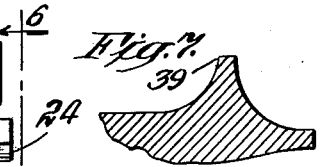
INVENTOR.
Lars Johan Faith-Ell
BY Edmund A. Flanader
his ATTORNEY Jan. 15, 1952   L. J. FAITH-ELL   2,582,244
GRATER HAVING ROTATABLE FEED MEANS
Filed Oct. 17, 1947   2 SHEETS—SHEET 2

INVENTOR.
Lars Johan Faith-Ell
BY Edmund A. Fenander
his ATTORNEY

Patented Jan. 15, 1952

2,582,244

UNITED STATES PATENT OFFICE 2,582,244

GRATER HAVING ROTATABLE FEED MEANS

Lars Johan Faith-Ell, Stockholm, Sweden, assignor to Aktiebolaget Elektrolux, Stockholm, Sweden, a corporation of Sweden Application October 17, 1947, Serial No. 780,541
In Sweden October 18, 1946

12 Claims. (Cl. 146—177)

My invention relates to graters for grating foods.

In graters heretofore provided for grating foods like root vegetables, almonds and other nuts, cheese and bread, for example, there is always some loss of food being grated. Such loss is often due to food remaining in a grating device after grating of a batch of material is completed. Food loss also results when the grated material becomes discolored.

It is an object of my invention to provide an improved grater of this type whereby grating of food is accomplished with minimum wastage and loss.

Another object is to provide such an improved grater in which the quantity of food remaining therein upon completing a grating operation is substantially reduced.

A further object is to provide a grater for grating food in which discoloring of grated material is avoided.

A still further object is to provide a grater for food whereby objectionable squirting and splashing of juice at the immediate vicinity of the grater is prevented.

A still further object is to provide a grater for food which is sturdy and durable and in which parts thereof are subjected to minimum stress while material is being grated.

The novel features which I believe to be characteristic of my invention are set forth with particularity in the claims. The invention, both as to organization and method, together with the above and other objects and advantages thereof, will be better understood by reference to the following description taken in connection with the accompanying drawings of which:

Fig. 1 diagrammatically illustrates a base member of a kitchen appliance having a meat grinder mounted thereon to which is attached a grater embodying the invention, the meat grinder and grater being shown in vertical section;

Fig. 2 is an enlarged longitudinal or side sectional view of a perforated jacket or housing for a grater like that shown in Fig. 1;

Fig. 3 is a side sectional view of the splash guard or protective shell of the grater shown in Fig. 1;

Fig. 4 is an end view of the splash guard illustrated in Fig. 3;

Fig. 5 is an enlarged side elevation of the grater roller of the grater shown in Fig. 1;

Fig. 6 is an end view taken at line 6—6 of Fig. 5;

Fig. 7 is a fragmentary sectional view of the grater roller taken at line 7—7 of Fig. 6;

Figure 8:
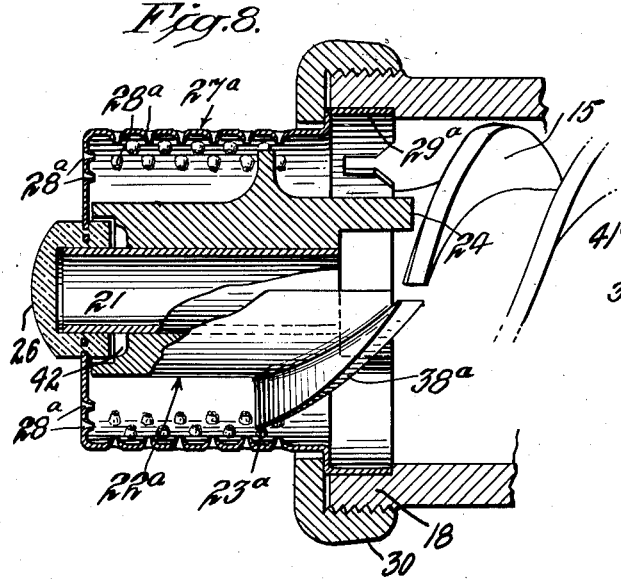
Fig. 8 is a side vertical section of a perforated grater housing and roller therein illustrating a modification of the invention.

Referring to the drawings, I have shown my invention in connection with a kitchen appliance provided with a base member 10 upon which is mounted a meat grinder 11 having a housing 12 providing an upright open-ended channel 14 serving as a passage through which food is introduced and fed to the region of a rotatable feed worm 15 in the lower part of the housing. The feed worm 15 is journaled at 16 in an apertured wall of the housing and formed with a stub shaft 17 which is arranged to be driven in any suitable manner, as through a clutch, for example, by an electric motor carried in the base member 10.

In order to simplify the drawings, the electric motor and connections from the shaft thereof to the stub shaft 17 have not been illustrated, it being understood that such motor driven connections for kitchen appliances are well known. A meat grinder 11 like that illustrated is usually provided with parts removably secured to an externally threaded apertured boss 18 of the housing 12, such parts serving to grind meat and the like and cooperating with a stub shaft or pin 19 projecting from the feed worm 15.

In accordance with my invention, I provide a grater 20 which is adapted to be attached to the housing 12 of the meat grinder for grating food when this is desired. The grater 20 comprises a hollow bearing sleeve 21 upon which is fitted a roller 22 formed with a ridge or flange 23 extending lengthwise thereof continuously from one end to its opposite end, and which will be described more fully hereinafter.

One end of the bearing sleeve 21 receives the stub shaft or pin 19 projecting from the feed worm 15, and an eccentrically disposed lug or projecting part 24 formed at an end of the roller 22 snugly fits in a recess at the end of the feed worm, thereby providing a detachable connection of the roller 22 to the feed worm for positively driving the roller and also accurately centering and aligning these parts. The opposite end of the bearing sleeve 21 is journaled in a recess 25 which is provided at the closed end or bottom 26 of an apertured grater jacket or casing 27 formed with grating teeth 28 and having an enlarged collar 29 at the open end thereof which is of such size that it snugly fits within the boss 18 of the grinder housing 12.

The grater jacket 27 is detachably secured to the grinder housing 12 by a ring member 30 threadedly connected to the boss 18, the ring member having an inwardly extending flange which overlies and snugly presses against the shoulder 31 at the inner end of the collar 29. In order to prevent relative angular movement between the housing 12 and the grater jacket 27, the collar 29 is formed with a notch 32 which receives a pin 33 fixed to the housing 12 and extending axially of the boss 18 at the inner wall surface thereof.

About the grater jacket 27 is disposed a splash guard 34 or protective shell in the form of an open-ended cylinder. The cylinder 34 may be conveniently made of sheet metal and formed with a relatively wide slot 35 at the bottom thereof, thereby providing a splash guard which is resilient in character. To detachably mount the splash guard 34 on the grater 20, the cylinder is formed with an annular groove 36 adjacent to an open end thereof, which is adapted to receive a number of spaced apart lugs 37 extending outwardly about the periphery of the ring member 30. By expanding the side walls of the splash guard 34 at opposite sides of the notch 35, the splash guard can be conveniently mounted in position on the lugs 37 and detached therefrom.

As previously explained, the roller 22 is formed with an upstanding ridge 23 which extends continuously from one end of the roller to its opposite end. The radius of the ridge 23 to its outer extremity is insignificantly smaller than the inner radius of the perforated grater jacket 27, that is, the clearance between the outer extremity of the ridge and the grating teeth 28 is at a minimum. When the grater 20 is mounted on the housing 12, the end portion 38 of the ridge 23 is juxtaposed to and more or less abuts the extreme outer end of the conveying thread of the feed worm 15 and constitutes an extension or continuation of the feed worm.

As best shown in Fig. 5, the ridge 23 is formed to provide a screw-shaped section which includes the end portion 38 and portions 39 and 40 immediately adjacent thereto. This screw-shaped section may be referred to as the transportation part or portion of ridge 23 which extends approximately halfway about the periphery of the roller 22, and is developed to promote rapid feeding of material to be grated into the interior of the grater jacket 27 without causing the material to be forced against the jacket collar 29 and subjecting the latter to excessive pressure. To promote rapid movement of material to be grated past the jacket collar 29, the axial pitch of the short end portion 38 of the ridge 23 is relatively great and at least approximately corresponds to the pitch of the conveying thread section of the feed worm 15 immediately adjacent thereto. The pitch of the ridge portion 39 joining the end portion 38 is relatively slight and is followed by the ridge portion 40 having a relatively high pitch.

In the drawings, Figs. 2, 5 and 6 have been drawn more or less to the same scale, and, when the roller 22 is disposed within the jacket 27, the transportation section of the ridge 23 occupies the position indicated in dotted lines in Fig. 1. It will be seen that the extreme end portion 38 of the ridge is directly opposite the jacket collar 29 while the ridge portion 39 of slight pitch extends axially of the jacket from the shoulder 31 to a region in the jacket which is well within the collar 29.

From the ridge portion 40 of the transportation section the ridge extends to the closed or bottom end 26 of the jacket 27 in a direction more or less parallel to the axis of rotation of the roller 22, as indicated at 41 in Fig. 5. The ridge section 41 extends lengthwise of the roller 22 for a distance which is at least approximately half of its length, and the outer extremity thereof is closely adjacent to the grating teeth 28 for a major portion of the distance from the bottom end 26 to the open collar end 29 of the apertured jacket 27. The ridge section 41 may be referred to as the forcing portion, and is developed to force the material to be grated against the jacket 27 when the roller 22 is rotated in the direction of the arrow in Fig. 6, so that the material will be disintegrated by the grater teeth 28 formed at the apertures in the jacket. The grated material passes from the apertured jacket or casing 27 through the slot 35 at the bottom of the splash guard 34 into a suitable collecting receptacle which may be placed below the splash guard. The outer extremity of the ridge section or rib portion 41 is best seen in Figs. 5 and 6 and projects downwardly in a diametrically opposite direction from the end of the rib portion 38 at the vicinity of the lug 24. As best shown in Fig. 6, the face of the rib portion 41 facing the right half of the body portion of the roller 22 of generally cylindrical form presents a surface whose radius changes abruptly. The opposing face of the rib portion 41 is best seen in Fig. 5 and presents an essentially smooth peripheral surface whose radius changes less abruptly and which merges with and constitutes a continuation of the cylindrical part of the body portion of the roller 22.

Graters for grating food and like the one just described have proven very satisfactory in that an insignificant amount of material being grated remains in the grater when grating of the material is completed. Hence, grating is accomplished with minimum loss of material, and I attribute this in great measure to the provision of the grater roller 22 having a continuously extending ridge 23 at the periphery thereof including a transportation portion to promote rapid feeding of material to be grated, and a forcing portion which is primarily effective to cause grating of the material. The transportation action and forcing action of the ridge 23 have also proven advantageous in that grating of material is accomplished with an insignificant quantity of juice being pressed from the material. By providing the splash guard 34 about the grater jacket, any juice which may be discharged from the apertured jacket 27, while material is being grated, will flow downwardly within the splash guard and pass therefrom at the slot 35. In this way objectionable splashing of juice at the immediate vicinity of the grater is avoided.

The end of the roller 22 adjacent to the closed or bottom end 26 of the jacket 27 is provided with a groove 42 which forms a well about the bearing sleeve 21, as best shown in Fig. 1. Such groove 42 is formed at a radially extending wall of the roller 22 which abuts the outer wall portion of the jacket formed by the bottom end 26. The groove 42 forms a well or recess having a peripheral surface which is of less diameter than the roller 22 and openly exposed to the shaft member or bearing sleeve 21 to provide an open space or void therebetween when operation of the grater is initially effected. When material is being grated, the groove 42 becomes filled with grated material and forms a seal at the bearing sleeve 21, so that material which has penetrated into the bearing sleeve cannot come into intimate contact and mix with grated material to cause discoloration. Similarly, a space 43 is provided at the opposite end of the roller 22 at the vicinity of the pin 19 which also becomes filled with grated material and forms a seal to prevent discoloration of the material.

The grater roller 22 may be formed of aluminum or a synthetic resin, for example. When the roller 22 is formed of aluminum, the bearing sleeve 21 may be formed of stainless steel or other suitable rust-proof material which is pressed or cast to the roller, whereby penetration of grated material along the bearing sleeve is prevented and discoloration of the material avoided.

The closed end or bottom 26 of the grater jacket 27 may be formed of a synthetic resin and provided with the aperture 25 in which one end of the bearing sleeve 21 is journaled, as previously explained, thus serving as a bearing for the sleeve 21. In Fig. 1 the bearing part 26 is joined directly to the inwardly extending flange 127 of the grater jacket 27 which may be formed of stainless steel, for example, while in Fig. 2 the bearing part 26 is joined to an annular member 44 which in turn is secured to the inwardly extending flange 127 of the jacket 27, as by welding or brazing, for example. The bearing part 26 is joined to the flange 127 in Fig. 1 and to the annular member 44 in Fig. 2 in any suitable manner so that relative angular movement between these parts is avoided. The bearing part 26 and aperture 25 therein are desirably formed and arranged with respect to the flange or bottom part 127 of the jacket 27 so that the end of the bearing sleeve 21 will be journaled along a region whose center point is approximately in line with the bottom part 127 of the jacket. Stated another way, the bearing sleeve 21 is journaled in the aperture 25 which extends approximately the same distance in opposite directions from a region substantially in the plane of the flange or bottom 127 of the grater jacket 27.

The difficulties usually encountered in providing effective journaling in the grater jacket, by virtue of the fact that the latter is generally formed of relatively thin sheet metal, have been overcome in the grater 20 just described. I have accomplished this by producing favorable load conditions attributable to the positioning of the bearing formed by the recess 25 in the part 26, and the development of the grater roller 22 having a single continuous ridge 23 along its periphery which more or less merges into and serves as a continuation of the conveying thread of the feed worm 15. By favorable load conditions I mean that the several parts of the grater 20 are not subjected to objectionable or excessive force produced while material is being grated, and this is especially true in regard to the axial load to which the grater is subjected while grating of material is being effected. This provides a grater construction which is sturdy and durable.

In Figs. 8 to 11 I have illustrated a modification of my invention which primarily differs from the embodiment just described in that an additional ridge is provided on the grater roller which is alongside the forcing portion 41 and follows and is behind the latter when material is being grated. In the modification of Figs. 8 to 11, in which parts similar to those shown in Figs. 1 to 7 are designated by the same reference numerals, the roller 22a is provided with a ridge 23a which includes an end screw portion 38a of comparatively great pitch which merges with and serves as a continuation of the conveying or material advancing thread of the feed worm 15. The screw portion 38a extends about the periphery of the roller 22a for a radial distance of about 90° and corresponds more or less to the end ridge portion 38 in Fig. 5 and acts to promote rapid feeding of material into the interior of the grater jacket 27a past the collar 29a.

The screw portion 38a at the end thereof remote from the feed worm 15 joins a ridge section 39a which is at right angles and normal to the axis of rotation of the roller 22a. The ridge section 39a corresponds to the ridge portion 39 of slight pitch in Fig. 5. At a region approximately 90° from the point at which the screw portion 38a joins the ridge section 39a, a ridge section 41a extends lengthwise of and parallel to the axis of rotation of the roller 22a toward the outer remote end thereof. The ridge section 41a corresponds to the forcing portion 41 in the embodiment first described.

The ridge section 39a extends approximately 90° about the periphery of the roller 22a past the region from which the forcing ridge portion 41a projects therefrom and hence passes about half way about the grater roller. The ridge portion 39a then merges and joins a screw-shaped portion 45a which extends axially of the roller at the region thereof occupied by the forcing ridge portion 41a. While the ridge portion 45a may be of slight pitch and approximately the same height or radial extent as the forcing ridge portion 41a, the grating action is improved by providing a ridge portion 45a of pronounced pitch and somewhat greater height or radial extent, as indicated at 46 in Fig. 9.

Figure 9:
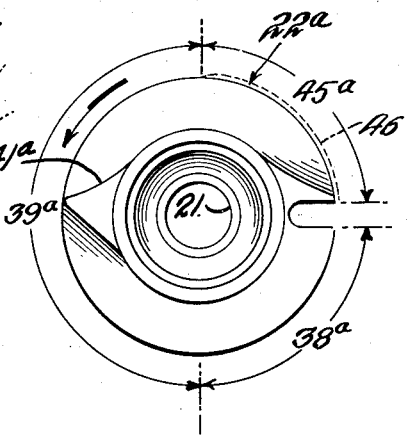
Fig. 9 is an end view of the grater shown in Fig. 8.
Figure 10:
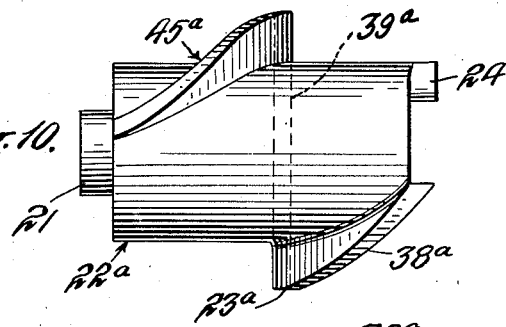
Figs. 10 and 11 are side elevations of diametrically opposing sides of the grater roller shown in Figs. 8 and 9.
Figure 11:
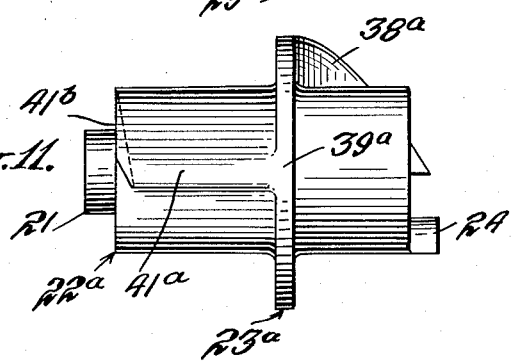

When material is being grated and the grater roller 22a is rotating in the direction indicated by the arrow in Fig. 9, the material is rapidly fed into the interior of the grater jacket 27a by the screw-shaped ridge portion 38a. Then the material is acted upon by the forcing ridge portion 41a and effects grating of the material in the same manner described above in the first described embodiment. The forcing ridge portion 41a differs from the forcing ridge 41 in Fig. 5 in that the end wall 41b thereof is also developed to bring material against grating teeth 28a formed at the bottom of the grater jacket.

Material within the grater jacket that slides past the forcing ridge portion 41a is thereafter acted upon by the screw-shaped ridge portion 45a which forces such material against the jacket 27a to be disintegrated by the grater teeth 28a. By providing the ridge 45a in addition to the forcing ridge 41a, the quantity of material remaining in the jacket upon completing a grating operation is further reduced.

In view of the foregoing, it will now be understood that an improved grater has been provided which embodies a rotatable member having an upstanding ridge extending lengthwise thereof, one section of such ridge being developed to promote rapid movement of material from a housing to the interior of an apertured grater jacket or casing which is in communication with the housing, and another section of the ridge further removed from the housing being developed to force the material against the jacket or casing to effect its disintegration. The two sections of the ridge taken together form a ridge portion which exends lengthwise of the roller between the ends of the grater jacket or casing, the section further removed from the housing taking up at least approximately half the length of such ridge portion. Further, the pitch of the ridge section nearer to the housing is essentially less than that of the other section.

In the space between the ends of the grater jacket or casing the forcing ridge 41 in the first described embodiment and the corresponding forcing ridge 41a in the modification of Figs. 8 to 11 each takes up at least half of the overall length of the ridge measured on a line parallel to the axis of rotation of the grater roller. In this way material to be grated is rapidly advanced into the interior of the grater jackets 27 and 27a at the regions of the open ends thereof by the ridge sections which act as the transportation parts or portions, and thereafter the advanced material is acted upon by the forcing ridge sections.

Modifications of the embodiments of my invention which I have described will occur to those skilled in the art, so that I desire my invention not to be limited to the particular arrangements set forth. I therefore intend in the claims to cover all those modifications and changes which come within the spirit and scope of my invention.

What is claimed is:

1. In combination with a food grinder having a housing provided with an opening and a rotatable feed worm arranged therein for advancing food toward the opening, of a grater comprising an apertured jacket formed with grating teeth which is adapted to be attached at one end to the housing at the opening, the opposite outer end of said jacket having a wall portion, a rotatable grater part in said jacket and cooperating therewith, said grater part having a shaft member projecting from an end thereof which is rotatably supported at the outer wall portion of said jacket, the end of said grater part from which said shaft member projects having a radially extending wall abutting the outer wall portion of said jacket, said grater part at such radially extending wall being formed with a recess having a peripheral surface which is of less diameter than that of the greater part and openly exposed to said shaft member to provide an open space or void therebetween when operation of the grater is initially effected, said grater part being adapted to be coupled to and cooperating with the feed worm.

2. In combination with a grinding device having a housing provided with an opening and a rotatable feed worm disposed therein having a wall at the outer end thereof and a thread for advancing material toward such wall at the vicinity of the opening, of a grater jacket adapted to be attached to the housing at the opening, a rotatable grater part disposed within said jacket and cooperating therewith, said grater part being adapted to be coupled to and cooperating with the worm, shaft means for maintaining said greater part rotatably positioned in said jacket when coupled to the feed worm, said grater part having a radially extending end wall abutting the wall at the outer end of the feed worm, the grater part at such radially extending wall being formed with a recess having a peripheral surface which is of less diameter than that of the grater part and openly exposed to said shaft means to provide an open space or void therebetween when operation of the grater is initially effected.

3. In combination with a grinding device having a housing provided with an opening and a rotatable feed worm arranged therein for advancing material to the opening, of a grater comprising an apertured jacket, means for detachably mounting said jacket on the housing including a member of annular form which is capable of being fastened to a part of the housing at the opening, a rotatable grater part in said jacket and cooperating therewith, said grater part being adapted to be coupled to the feed worm and arranged to receive material advanced by the latter, and structure providing a protective shell to prevent splashing of liquid in the immediate vicinity of said grater, said protective shell comprising an open-ended cylinder of larger diameter than said jacket and having an elongated slot extending lengthwise of the cylinder throughout the entire length thereof, means including said annular member for supporting said cylinder to position the latter axially of said jacket and spaced therefrom, the opposing edge portions of said cylinder at the slot being movable from each other when manually grasped to expand said cylinder and facilitate positioning of the latter on said annular member, and said cylinder being retractable and firmly held on said annular member when the opposing edge portions thereof at the slot are released.

4. In combination with a grinding device having a housing provided with an opening and a rotatable feed worm arranged therein for advancing material to the opening, of a grater comprising an apertured jacket, means for detachably mounting said jacket on the housing including a ring member threadedly engaging a part of the housing at the opening, a rotatable grater part in said jacket and cooperating therewith, said ring member having outwardly extending projections in spaced apart relation, said grater part being adapted to be coupled to the feed worm and arranged to receive material advanced by the latter, and structure providing a protective shell to prevent splashing of liquid in the immediate vicinity of said grater, said protective shell comprising an open-ended cylinder formed of relatively thin sheet metal having an elongated slot extending lengthwise thereof, and said cylinder being indented at one end thereof for resiliently holding said cylinder on said spaced apart lugs to maintain said cylinder axially of said jacket and spaced therefrom.

5. In combination with a food grinder having a housing provided with an opening and a rotatable feed worm disposed therein having a thread for advancing food toward the opening, of a food grater comprising an apertured jacket formed with grating teeth which is adapted to be attached to the housing at the opening, a grater roller disposed within said jacket and cooperating therewith, and means for detachably coupling said roller and feed worm to prevent relative angular movement therebetween, said detachable coupling means being capable of effecting such coupling only when said roller is in a single fixed angular position with respect to the feed worm, said roller comprising a body portion of which at least a part thereof is of generally cylindrical form and of less diameter than said jacket, and an upstanding rib on said body portion which extends axially thereof and includes first and second portions, said first rib portion always having one end thereof juxtaposed to and essentially forming a continuation of the advancing thread of the feed worm when the latter and roller are effectively coupled to one another by said coupling means, said first rib portion having a pitch which provides means primarily for advancing food from the housing into the interior of said jacket to a region inwardly removed from the open end of the jacket at the connection thereof to the housing and effecting such axial advance of the food with minimum radial pressure transmitted to the wall of the jacket at the immediate vicinity of its connection to the housing, and said second rib portion having a pitch which provides means for acting on the food which has been so advanced and force such food against the grating teeth to effect grating thereof, said second rib portion having one surface whose radius changes abruptly and another surface whose radius changes less abruptly and presents an essentially smooth peripheral surface which merges with and constitutes a continuation of the cylindrical part of said body portion.

6. In combination with a food grinder having a housing provided with an opening and a rotatable feed worm disposed therein having a thread for advancing food toward the opening, of a food grater comprising an apertured jacket formed with grating teeth which is adapted to be attached to the housing at the opening, a rotatable grater part disposed within said jacket and cooperating therewith, and means for detachably coupling said grater part and feed worm to prevent relative angular movement therebetween, said detachable coupling means being capable of effecting such coupling only when said grater part is in a single fixed angular position with respect to the feed worm, said grater part including an upstanding rib which extends axially thereof and includes first and second portions, said first rib portion always having one end thereof juxtaposed to and essentially forming a continuation of the advancing thread of the feed worm when the latter and grater part are effectively coupled to one another by said coupling means, said first rib portion having a pitch which is in a range between that of the feed worm thread and a value of less magnitude to provide means primarily for advancing food from the housing into the interior of said jacket to a region inwardly removed from the open end of the jacket at the connection thereof to the housing and effecting such axial advance of the food with minimum radial pressure transmitted to the wall of the jacket at the immediate vicinity of its connection to the housing, and said second rib portion having a pitch which is of essentially greater magnitude than said first rib portion to provide means for acting on the food which has been so advanced and force such food against the grating teeth to effect grating thereof and minimize extraction or pressing of juice from the food being so disintegrated.

7. The combination set forth in claim 6 in which said rotatable grater part further includes a third upstanding rib portion which extends lengthwise thereof along the axially extending region occupied by said second rib portion, said third rib portion providing means in addition to said second rib portion to effect grating of food advanced into the interior of said jacket by said first rib portion.

8. The combination set forth in claim 6 in which said rotatable grater part further includes a third upstanding rib portion which extends lengthwise thereof along the axially extending region occupied by said second rib portion, said third rib portion providing means in addition to said second rib portion to effect grating of food advanced into the interior of said jacket by said first rib portion, and the ends of said second and third rib portions nearer to the housing join a portion of said rib which is intermemediate the ends of said rotatable grater part and disposed approximately at a right angle to the longitudinal axis thereof.

9. The combination set forth in claim 8 in which said third rib portion is screw-shaped and of greater height or radial extent than said first and second rib portions.

10. The combination set forth in claim 6 in which said apertured jacket is formed of sheet metal and adapted to be attached at one end to the housing at the opening, the opposite end of said jacket including an end wall and a bearing member held in such wall and forming a unitary part thereof for journaling an end of said roller, said bearing member being centrally disposed on said end wall and having axially extending portions to effect such journaling projecting substantially the same distance from opposing faces of said end wall.

11. In combination with a grinding device having a housing provided with an opening and a rotatable feed worm part disposed therein formed with a recess at an end thereof and having a thread for advancing material toward such end at the vicinity of the opening, of a grater comprising an apertured jacket formed with grating teeth which is adapted to be attached to the housing at the opening, a rotatable grater part adapted to be positioned within said jacket, said grater part including an upstanding rib which extends lengthwise thereof, and means for detachably coupling said feed worm part and grater part to prevent relative angular movement therebetween, said coupling means including an eccentrically disposed lug projecting axially from an end of said grater part and the recess arranged to receive such lug when said parts are positioned in axial alignment to be coupled to one another, and said lug and recess being capable of coupling said parts only when one end of said rib on said grater part is juxtaposed to an end of the material advancing thread of said feed worm part and forms a continuation of the latter, said rib including one portion which is developed essentially for transporting material to be grated axially of said grater part and whose pitch is in a range between that of said feed worm thread and a value of less magnitude, and another portion which is developed essentially for forcing the material against the grating teeth to effect grating thereof and whose pitch is of an essentially greater magnitude than said one portion, said other portion being further removed than said one portion from the end of said grater part adapted to be coupled to said feed worm part.

12. In combination with a grinding device having a housing provided with an opening and a rotatable feed worm part disposed therein having a thread for advancing material toward the opening, of a grater comprising an apertured jacket formed with grating teeth which is adapted to be attached to the housing at the opening, a rotatable grater part adapted to be positioned within said jacket, and means for detachably coupling said feed worm and grater part to prevent relative angular movement therebetween, said coupling means including an abutment which is associated with one of said parts and engages a surface portion of said other part when said parts are positioned in axial alignment to be coupled to one another, said abutment and surface engaging portion being eccentrically disposed with respect to the axis of rotation of the feed worm and grater part, said grater part including an upstanding material transporting ridge which extends axially thereof and includes first and second portions, said abutment and surface engaging portion being capable of coupling said parts only when an end of said first ridge portion on said grater part is juxtaposed to an end of the material advancing thread of said feed worm part and essentially forms a continuation of the latter, said first ridge portion having a pitch which is in a range between that of the feed worm thread and a value of less magnitude to provide means primarily for transporting material to be grated axially of said grater part, and said second ridge portion having a pitch which is of essentially greater magnitude than said first ridge portion to provide means essentially for forcing the material against the grating teeth to effect grating thereof, said second ridge portion being further removed than said first ridge portion from the end of said grater part adapted to be coupled to said feed worm.

LARS JOHAN FAITH-ELL.

REFERENCES CITED

The following references are of record in the file of this patent:

UNITED STATES PATENTS

| Number | Name | Date |
|---|---|---|
| 842,236 | Neukirchen | Jan. 29, 1907 |
| 908,348 | Stenz | Dec. 29, 1908 |
| 1,762,368 | Vandergrift | June 10, 1930 |
| 2,042,161 | Satzinger | May 26, 1936 |
| 2,142,480 | Satzinger | Jan. 3, 1939 |
| 2,144,055 | Hall | Jan. 17, 1939 |
| 2,181,780 | Braun | Nov. 28, 1939 |
| 2,216,023 | Schmidt | Sept. 24, 1940 |

FOREIGN PATENTS

| Number | Country | Date |
|---|---|---|
| 93,111 | Sweden | Oct. 28, 1938 |